United States Patent [19]

Hung

[11] Patent Number: 5,059,409

[45] Date of Patent: Oct. 22, 1991

[54] BROMINATED GRAPHITIZED CARBON FIBERS

[75] Inventor: Ching-Cheh Hung, Westlake, Ohio

[73] Assignee: The United States of America as represented by the Administrator of the National Aeronautics and Space Administration, Washington, D.C.

[21] Appl. No.: 443,289

[22] Filed: Nov. 30, 1989

Related U.S. Application Data

[63] Continuation-in-part of Ser. No. 219,016, Jul. 14, 1988, abandoned.

[51] Int. Cl.[5] .......... C01B 31/04

[52] U.S. Cl. .......... 423/448; 423/439; 423/460; 252/502

[58] Field of Search .......... 423/439, 448, 460, 489; 252/502; 510/160, 240, 253

[56] References Cited

U.S. PATENT DOCUMENTS

| | | | |
|---|---|---|---|
| 3,089,754 | 5/1963 | Nedopil | 423/448 |
| 3,409,563 | 11/1968 | Olstowski | 423/448 |
| 3,539,372 | 11/1970 | Hardy et al. | 423/460 |
| 3,931,392 | 1/1976 | Deitz | 423/448 |
| 3,969,489 | 7/1976 | Wu | 423/446 |
| 4,388,227 | 6/1983 | Kalnin | 423/447.7 |
| 4,565,649 | 1/1986 | Vogel | 423/448 |
| 4,749,514 | 6/1988 | Murakami et al. | 423/449 |

OTHER PUBLICATIONS

Dresslhaus et al., "Intercalation Compounds of Graphite", Advances in Physics, 1981, vol. 36, No. 2, pp. 139-152, 266-276.

Chung et al., "Are Brominated Thornel P-100 Crabon Fibers Intercalated?", pp. 125-126.

Hooley et al., "The Intercalation of Bromine in Graphitized Carbon Fibers and Its Removal", Carbon, vol. 16, No. 4, 1978, pp. 251-257.

*Primary Examiner*—Robert Kunemund
*Attorney, Agent, or Firm*—Gene E. Shook; John R. Manning; James A. Mackin

[57] ABSTRACT

Low cost, high break elongation graphitized carbon fibers having low degree of graphitization are inert to bromine at room or higher temperatures, but are brominated at −7° to 20° C., and then debrominated at ambient. Repetition of this bromination-debromination process can bring the bromine content to 18%. Electrical conductivity of the brominated fibers is three times of the before-bromination value.

1 Claim, 3 Drawing Sheets

BROMINATED GRAPHITIZED CARBON FIBERS

ORIGIN OF THE INVENTION

The invention described herein was made by an employee of the U.S. Government and may be manufactured and used by or for the Government for governmental purposes without the payment of any royalties thereon or therefore.

STATEMENT OF COPENDENCY

This application is a continuation-in-part of application Ser. No. 219,016 which was filed July 14, 1988, now abandoned.

TECHNICAL FIELD

This invention is concerned with pitch-based brominated graphitized carbon fibers having small crystallites and large interplanar spacings. The invention is particularly directed to such fibers having improved properties.

In the past, brominated graphitized carbon fibers have been fabricated by submerging highly graphitized pristine graphite fibers in liquid or saturated vaporous bromine at room temperature for a period of time ranging from 5 minutes to many days. This was followed by debromination at ambient conditions for 1–20 days.

This conventional method produced brominated graphitized carbon fibers which contained about 18% bromine by weight. The fibers produced by this process were about five times more electrically conductive than the pristine fibers.

One of the disadvantages of this conventional process is that it is limited to highly graphitized carbon fibers having large crystallites, small interplanar spacing and low break elongation values. Typically the break elongation values are about 0.31%. This fiber is not only expensive, but also difficult to process for engineering purposes. The less expensive, easier to process fibers having small crystallites, larger interplanar spacing and high break elongation values are inert to bromine under the conditions of the conventional method.

It is, therefore, an object of the present invention to provide brominated graphitized carbon fibers from less graphitized, less expensive fibers as the starting material which produces a product having an improved break elongation values.

BACKGROUND ART

Ukaji et al, U.S. Pat. No. 3,925,263 is directed to a process for reacting fluoride with graphite fibers. The carbon material may be either in amorphous or crystalline form, and the reaction is carried out at 250°–600° C.

Kome et al, U.S. Pat. No. 3,929,920 is directed to a process for fluorination of carbon by contact with fluorine gas. The carbon powder is in either amorphous or crystalline form and it is reacted at temperatures as low as 250° C.

Tiedmann, U.S. Pat. No. 4,036,786 describes a fluorinated carbon composition which has significantly increased specific resistance. The material is utilized in electrical resistors.

Aramaki et al, U.S. Pat. No. 4,438,086 is concerned with a method and apparatus for the preparation of graphite fluoride by contact reaction between carbon and fluoride gas. The carbon is either amorphous or crystal and the reaction may take place as low as 200° C.

Vogel, U.S. Pat. No. 4,565,649 is concerned with a process for producing graphite fibers with high electrical conductivity. The summary of the invention points that the fiber is a composition of graphite, Bronsted acid including hydrogen fluoride or hydrogen bromide, and a metal fluoride. Graphites can be used which have a low degree of crystallinity.

DISCLOSURE OF THE INVENTION

According to the present invention the bromination process is conducted in a relatively low temperature range. Such a range extends between the melting point of bromine and room temperature for liquid bromination, and −15° C. to 0° C. for vaporous bromination. The graphitized carbon fibers to be brominated at these temperatures can be less expensive and have higher break elongation values than those used in prior art processes because they can have smaller crystallites and larger interplanar spacings. These fibers may be either pristine fibers or previously brominated. Bromination of these fibers at these temperatures increases their electrical conductivity.

BRIEF DESCRIPTION OF THE DRAWINGS

The advantages and novel features of the invention will be more fully apparent when read in connection with the accompanying drawings wherein.

BEST MODE FOR CARRYING OUT THE INVENTION

Figure 1:
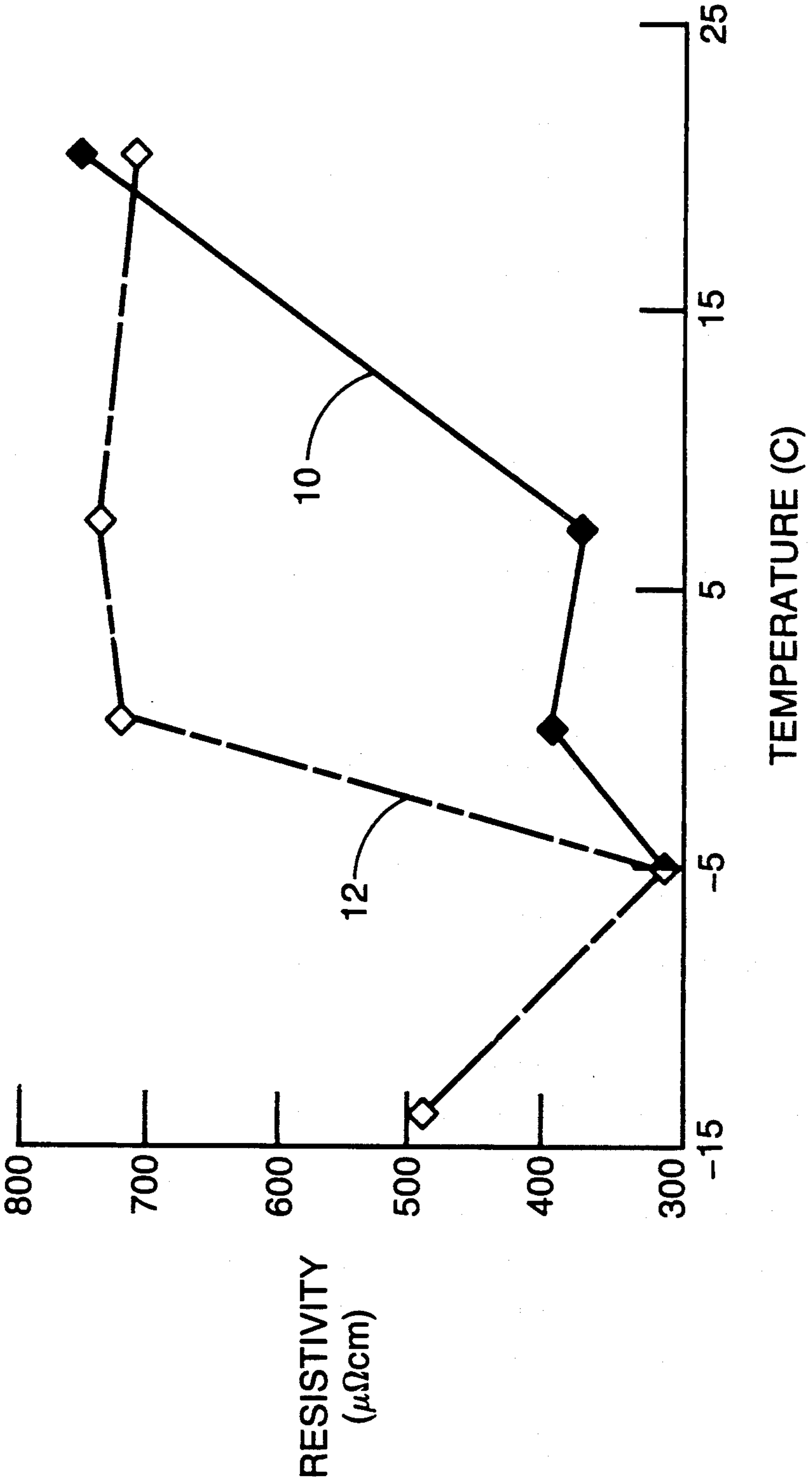
FIG. 1 is a graph showing the electrical resistivity of small crystallite, large interplanar spacing brominated graphitized carbon fiber as a function of bromination temperature.

According to the present invention, brominated graphitized carbon fibers having lower degrees of graphitization than prior art fibers are produced. The graphite fibers to be brominated can be either pristine fibers or fibers previously brominated.

The fibers with "lower degree of graphitization" are those fibers having interplanar spacing in the 3.40–3.45 Å range and crystallite size in the 30–70 Å range. These compare to the prior art fibers for bromination, where the interplanar spacing and the crystallite sizes are 3.37–3.39 Å and >100 Å, respectively.

The graphitized carbon fibers are first cooled to a temperature between −7.2° C., which is the melting point of bromine, and room temperature. Refrigeration apparatus having the ability to control bromination temperature in this range has been found to be acceptable. By way of example, test tubes containing graphitized carbon fibers in direct contact with liquid bromine are placed in the coolant container of a recirculation cooler. The cooler has the ability to control the temperature of the coolant in the −20° C. to +75° C. range.

The refrigerated graphitized carbon fibers or the graphitized carbon fibers being refrigerated are exposed to a liquid or vaporous bromine. Liquid bromine has the advantages in the bromination process because vaporous bromine reacts with fibers slowly due to the very low vapor pressure in the low temperature range utilized in the bromination process.

Vaporous bromine may be used instead of liquid bromine if a slower rate of reaction is acceptable. Vaporous bromine may be preferred if controlling liquid bromine, which is a hazardous material, presents a problem.

The effects of the bromination temperature on the electrical resistivity and the mass of less graphitized fibers are shown in the drawings. Conventional graphitized carbon fibers known commercially as Amoco P-55 fibers cannot be brominated in a satisfactory manner utilizing conventional processes. These fibers have interplanar spacing of 3.42 Å and crystallites of 50 Å. However, these commercial fibers were brominated with the improved process at a temperature between −5° C. and 20° C. for liquid bromination, or between −15° C. and 20° C. for vaporous bromine.

FIG. 1 shows the effect of the bromination temperature on the electrical resistivity of the P-55 fibers. The resistivity of the pristine fibers to be brominated is about 850 μΩ cm. The resistivity of graphite fibers brominated by liquid bromine is shown by the line 10 while the resistivity of those fibers brominated by vaporous bromine is shown by the line 12.

Figure 2:
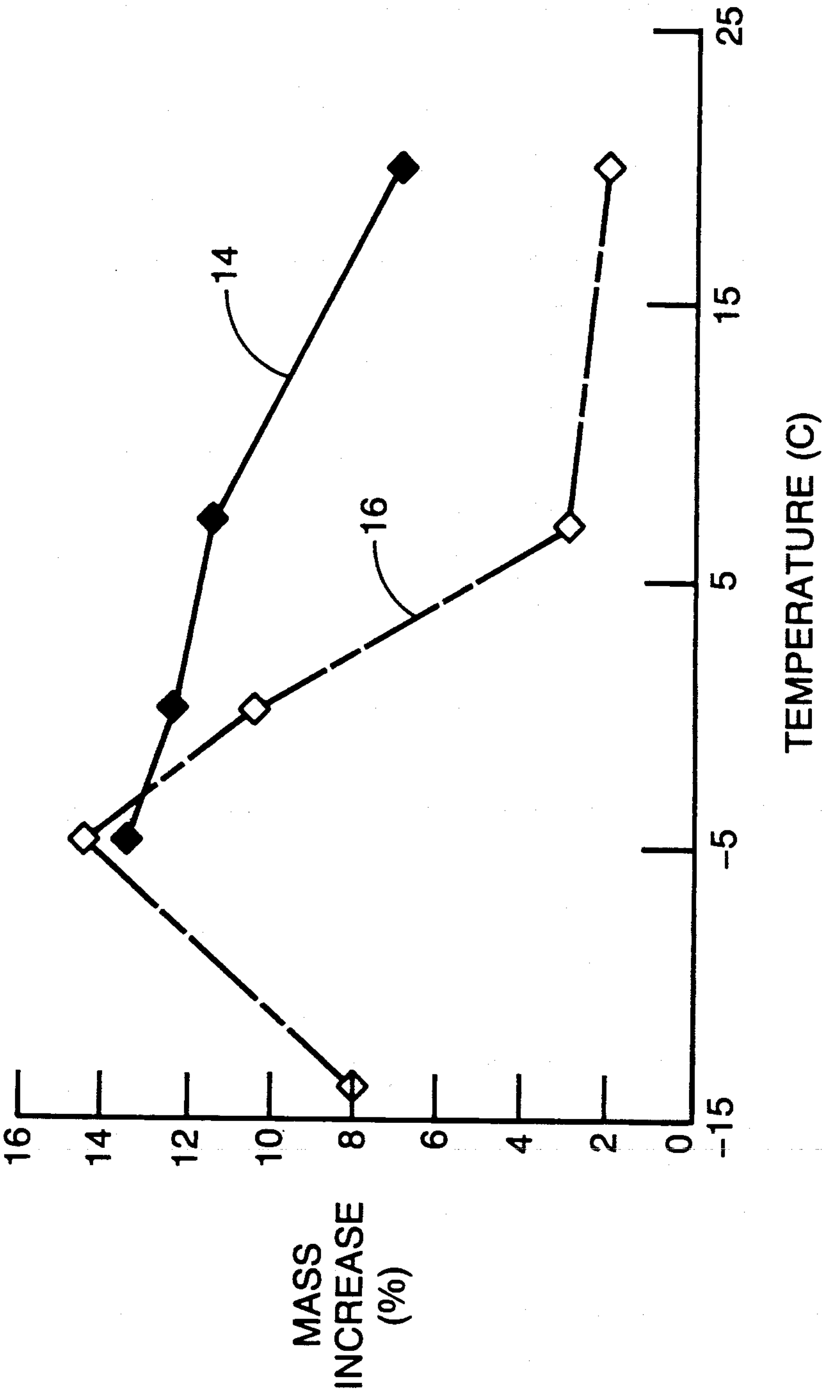
FIG. 2 is a graph showing the bromine to carbon weight ratio of small crystallite, large interplanar spacing brominated graphitized carbon fiber as a function of bromination temperature.

Referring now to FIG. 2, there is illustrated the effect of the bromination temperature on the mass of the P-55 fibers. The mass increase of the graphite fibers during bromination using liquid bromine as a function of the bromination temperature is shown by the line 14. This increase during bromination using vaporous bromine is shown by the line 16.

These graphs shown that at a bromination temperature of about 20° C., both the liquid and the vaporous bromine have only slight effects on the resistivity of the graphite fibers, even though the fibers increase in mass. This weight increase is about 1.95% for the fibers brominated by vaporous bromine and about 7% for those brominated by liquid bromine.

TABLE I

Structural, Chemical, and Physical Properties of the Small Crystallite, Large Interplanar Spacing Graphitized Carbon Fibers Before and After Low Temperature Bromination

| | Before Bromination | After Bromination |
|---|---|---|
| Interplanar Spacing (Å) | 3.42 | 3.43 |
| Crystallite size (Å) | 50 | 50 |
| Bromine to carbon weight ratio (%) | 0 | 14 |
| Tensile strength (Ksi) | 275 | 275 |
| Modulus (Msi) | 55 | 55 |
| Break Elongation (%) | 0.5 | 0.5 |
| Thermal Conductivity (W/m-K) | 100 | 100 |
| Electrical Resistivity (μΩ-cm) | 850 | 300 |
| Diameter (μm) | 9-12 | 9.5-12.5 |
| Coefficient of Thermal Expansion (ppm/°C.) | −1 | −1 |

These graphs further show that the fiber resistivity decreases to about one-third of its pristine value if the bromination is carried out at a temperature of about −5° C. for vaporous bromination, or at a temperature in the range of −5° C. to 0° C. for liquid bromination. In both cases the fibers gain about 14% weight, and the fiber diameter increase due to bromination was about 5%. X-ray data indicates that bromination causes the interplanar spacing of this fiber to increase from 3.42 to 3.43 Å. However, changes of crystallite size, tensile strength, modulus, break elongation, coefficient of thermal expansion, and thermal conductivity of this fiber due to bromination are within the error of the measuring instrument. Table 1 shows the structural, chemical and physical properties of this fiber, which is Amoco P-55, before and after the low temperature bromination.

ALTERNATE EMBODIMENT OF THE INVENTION

Rebrominating previously brominated-debrominated fibers may produce further gains in the bromine contents. This is especially true if the fibers are in large quantity and/or are tightly packed. By way of example, 41 grams of previously described Amoco P-55 graphitized carbon fibers in the form of unidirectional weaved fabric were in direct contact with −7° C. saturated vaporous bromine for 7 days. The fibers were debrominated in room air for two days to produce a product with a 4.9% bromine to carbon weight ratio. The fibers were placed in direct contact with −7° C. saturated vaporous bromine again for another 5 days and debrominated in room air for 2 days which resulted in a product with a 5.9% bromine to carbon weight ratio.

The fibers were then placed in direct contact with −7° C. liquid bromine for another 4 days and debrominated for 2 days to produce in a product with an 18% bromine carbon weight ratio. This is higher than the 14% from the previously described process illustrated in FIG. 2, where only one cycle of the bromination-debromination process was performed.

Figure 3:
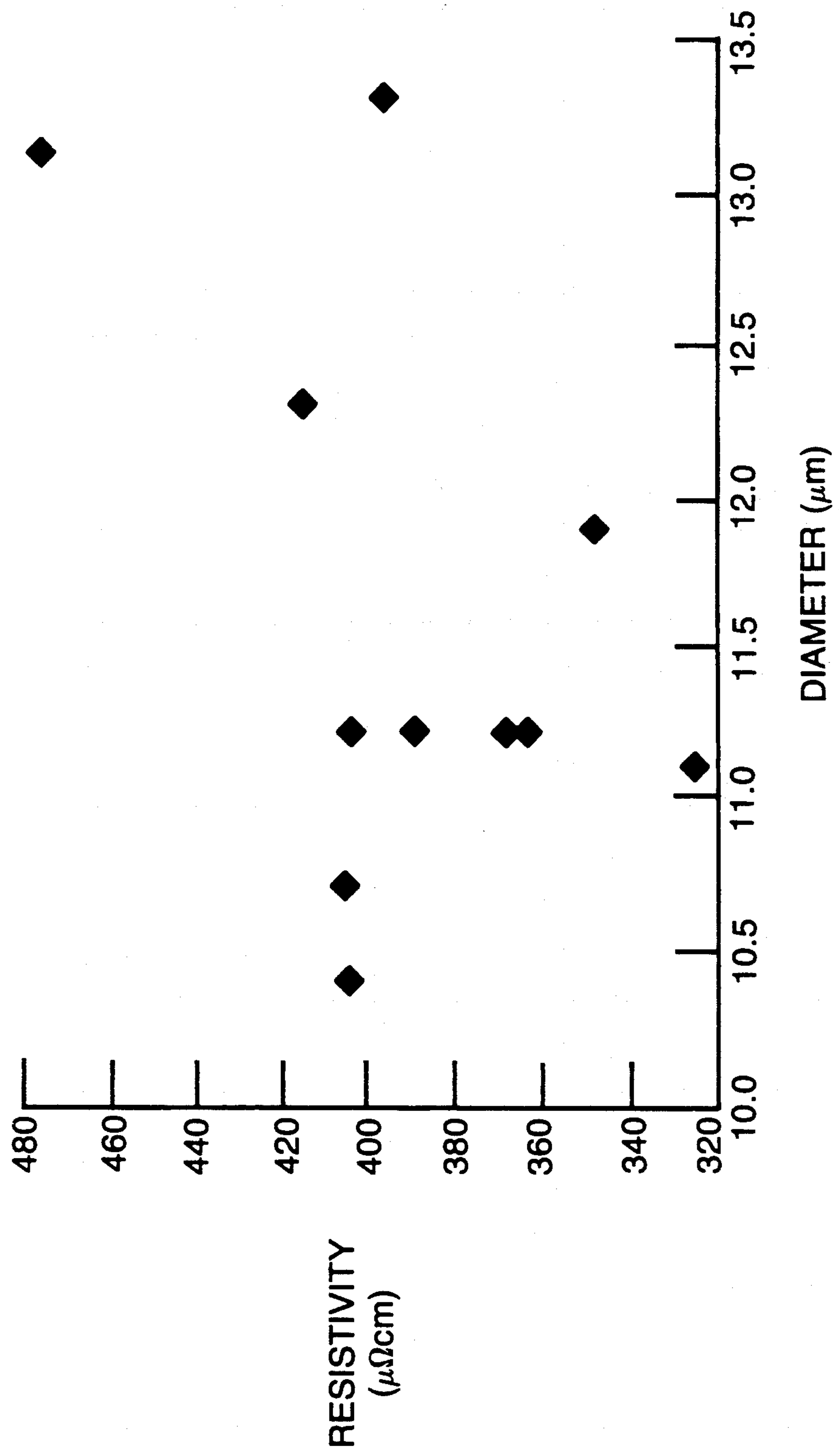
FIG. 3 is a graph showing the electrical resistivity of small crystallite, large interplanar spacing brominated graphitized carbon fiber as a function of fiber diameter. The bromine to carbon weight ratio of the fibers for this figure is 18%.

FIG. 3 shows the resistivity-diameter relation of the 18% bromine fiber. The diameter of this brominated fiber is in the 10–13 μm range, while the before-bromination diameter of the same fiber is in the 9–12 μm range. Also, the resistivity is uniform at about 400 μΩ-cm for the fibers with diameters smaller than 11 μm, decreases sharply to 320 μΩ cm for the fibers with diameters in the 11–12 μm range. The resistivity becomes larger and relatively nonuniform for fibers with diameter greater than 12 μm. This indicates structural damages of large diameter fibers due to excessive bromination. Therefore, optimization of repeated bromination-debromination process is needed to increase the bromine content, and therefore the electrical conductivity, of a large quantity of fibers without causing fiber structural damages.

Any pitch-based fibers with crystallite size and interplanar spacings in the 30–70 Å and 3.40–3.45 Å ranges can be used as the starting materials for bromination. This includes, but not limited to, the Amoco P-55, which is used as an example in this disclosure. Other pitch-based fibers with the above described structure can have physical properties different from those described in Table 1. However, the effects of bromination remain unchanged. That is, after bromination the fibers contain 14–18% bromine, have diameters 5–15% larger than the before-bromination values, electrical conductivity 3 times the before-bromination values, interplanar spacing 0.01–0.02 Å larger than the before-bromination values. The tensile strength, modulus, coefficient of thermal expansion, and thermal conductivity values remain unchanged.

While several embodiments of the invention have been disclosed it will be appreciated that various changes and modifications may be made to the process of the invention without departing from the spirit of the invention or the scope of the subjoined claims.

I claim:

1. A brominated graphitized carbon fabric material comprising a plurality of pitch-based rebrominated previously brominated-debrominated graphitized carbon fibers having a unidirectional weave, each of said fibers having (a) a bromine to carbon weight ratio of 18%, (b) a diameter between 11 μm and 12 μm, (c) a resistivity of 320 μΩ-cm, (d) an interplanar spacing which is about 0.01 Å to about 0.02 Å more than before-bromination, and (e) a crystallite size which is substantially unchanged by bromination.

* * * * *